United States Patent [19]
Heraly et al.

[11] Patent Number: 5,921,459
[45] Date of Patent: Jul. 13, 1999

[54] MODULAR ROBOTIC WELDING STATION

[75] Inventors: Thomas P. Heraly, Appleton; Robert E. Hintz, Hortonville, both of Wis.

[73] Assignee: Illinois Tool Works Inc., Glenview, Ill.

[21] Appl. No.: 08/842,902

[22] Filed: Apr. 17, 1997

[51] Int. Cl.[6] .................................................. B23K 37/00
[52] U.S. Cl. ........................... 228/45; 228/47.1; 219/79; 414/222; 29/784; 901/42
[58] Field of Search ............. 228/4.1, 45, 47.1; 29/771, 784, 791; 219/79, 125.1; 414/222; 901/42

[56] References Cited

U.S. PATENT DOCUMENTS

| | | | |
|---|---|---|---|
| 4,611,749 | 9/1986 | Kawano | 228/45 |
| 4,678,110 | 7/1987 | Handa | 228/4.1 |
| 4,740,133 | 4/1988 | Kawano | 414/730 |

OTHER PUBLICATIONS

1–page sales flyer entitled Bancroft Capabilities—By Bancroft Corp.
2–page (back–to–back) Sales flyer entitled Arcmotion SK–1000 by Miller Electric Mfg. Co. Inc.
2–page (back–to–bacl) Sales Flyer entitled Arcmotion SK–2000 by Miller Electric Mfg. Co., Inc.

*Primary Examiner*—Samuel M. Heinrich
*Attorney, Agent, or Firm*—Mark W. Croll; Thomas W. Buckman; John P. O'Brien

[57] ABSTRACT

A modular robotic welding station comprises a base skid to which is mounted robotic welding equipment. The base skid defines one or more docking stations. Satellite modules can have either stationary tables or turn tables that hold the workpieces to be welded. The satellite modules are detachably and interchangeably docked to selected base skid docking stations to thereby create customized workstations for the workpieces. The docking stations, satellite modules, and tables are designed to accurately locate the workpieces relative to the welding equipment. By detaching the satellite modules from the skid base, the satellite modules and skid base are easily transported individually from one location to another. A safety fence secured to the skid base can be arranged in different configurations to suit whether or not a satellite module is docked at a docking station.

7 Claims, 4 Drawing Sheets

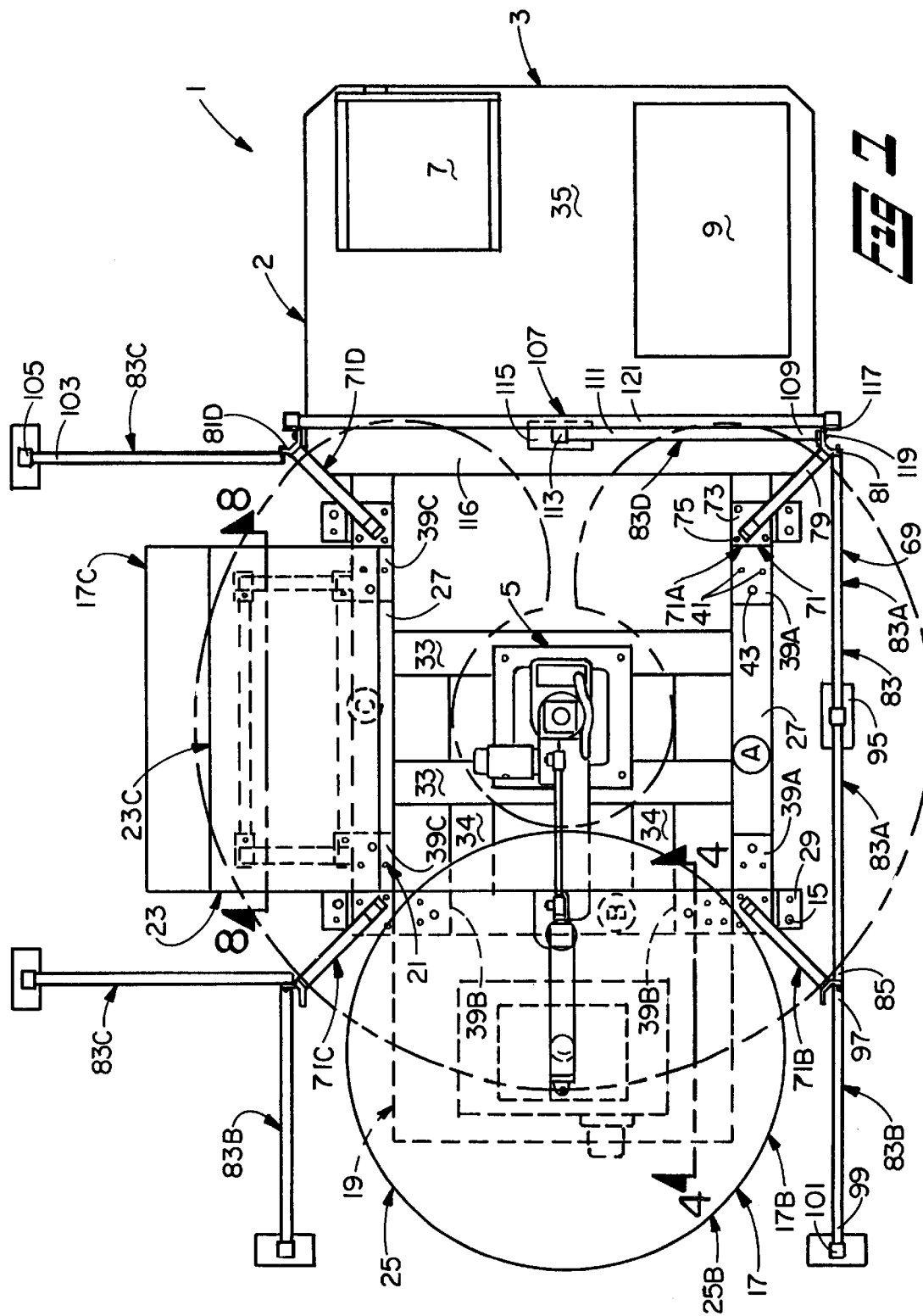

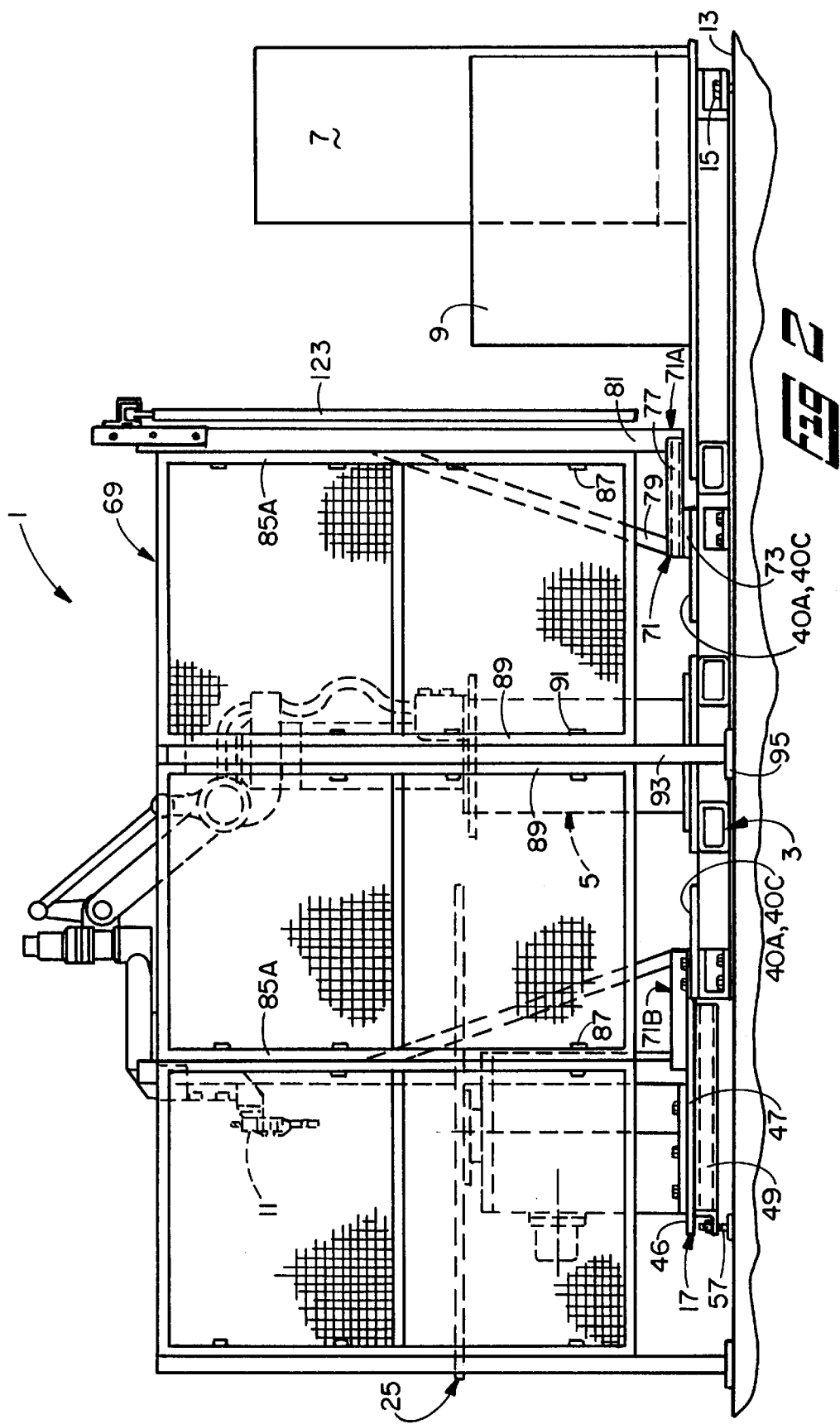

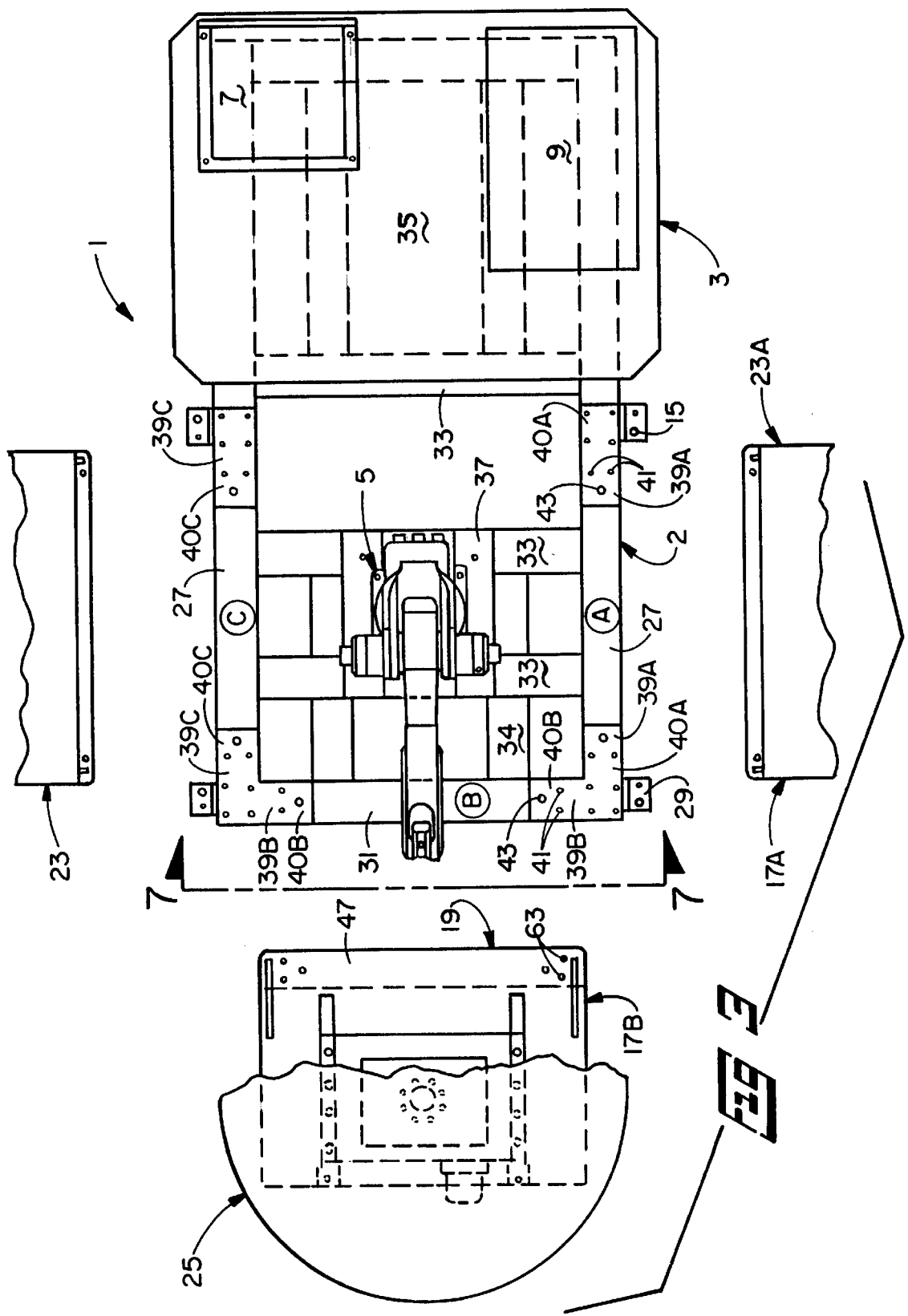

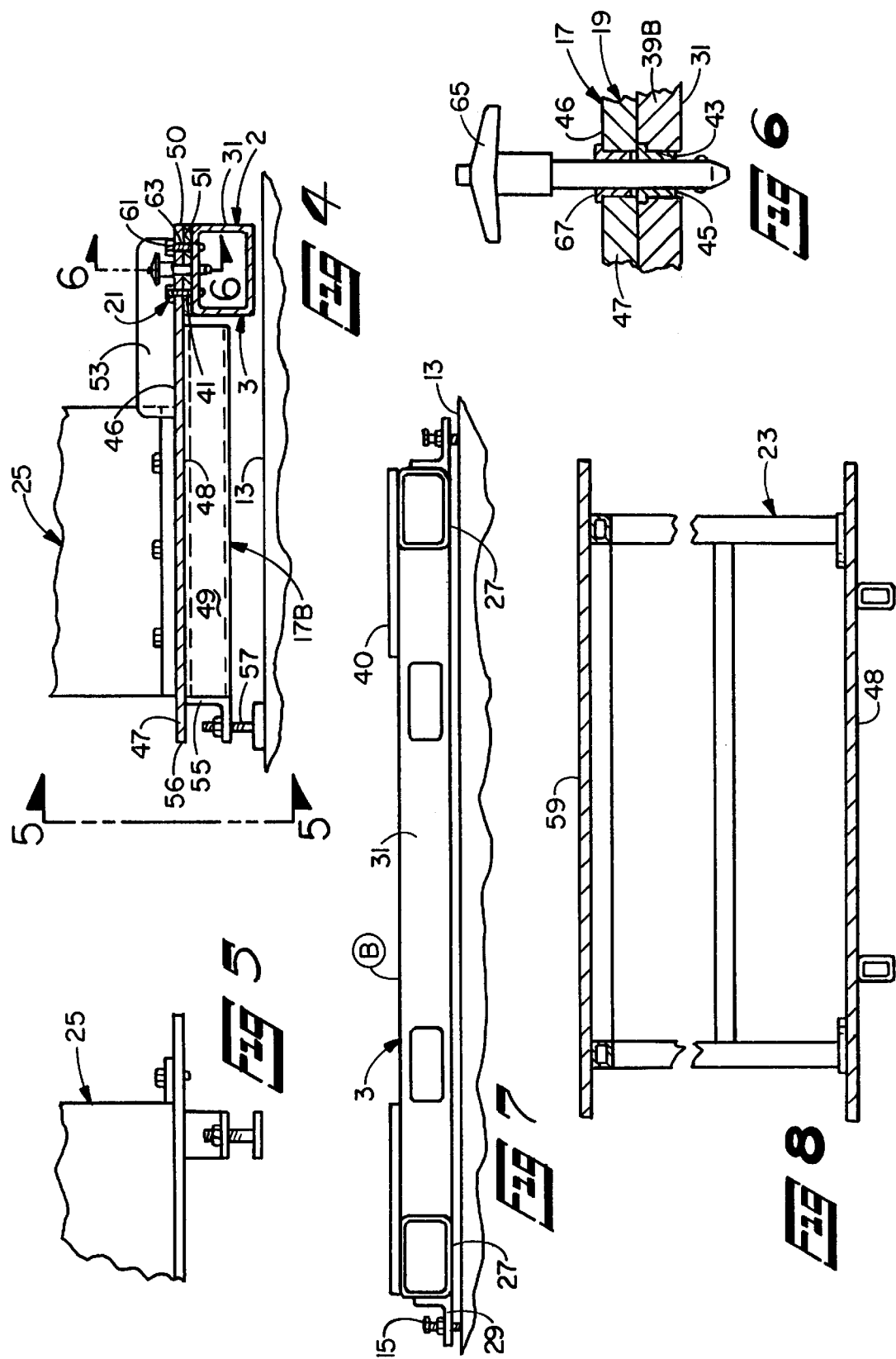

MODULAR ROBOTIC WELDING STATION

1. BACKGROUND OF THE INVENTION

This invention pertains to apparatus and methods for welding workpieces, and more particularly to modular workstations that can be interchangeably located around a central welding machine.

2. DESCRIPTION OF THE PRIOR ART

Various equipment has been developed to hold workpieces as they undergo welding operations. For example, it is well known to hold a workpiece to a table located close to a welding robot.

An exemplary welding robot and table system is manufactured by Miller Electric Manufacturing Company of Appleton, Wis., under the trademark Arcmotion. That system comprises a robot manipulator that is permanently fastened to a floor frame. A turn table is located such that the robot manipulator can reach and weld workpieces on the turn table. Protective fencing secured to the floor frame limits access to the robot manipulator and the turn table. A somewhat similar system is manufactured by the Bancroft Corporation of Waukesha, Wis.

In many manufacturing facilities, it is desirable that welding robots and their workpiece-holding tables be transportable between different locations in the facility. Accordingly, the Miller Electric Arcmotion welding system was designed to be lifted and carried by a fork lift truck. However, the weight and size of the combined robot manipulator, turn table, and floor frame required very heavy moving equipment and generally made it difficult to transport and maneuver the system. The combined robot-table systems of other manufacturers suffer from the same problem.

Another drawback of the prior robotic welding systems was that they could accommodate only one workpiece holding table. For practical purposes, therefore, the system had but a single workstation. That characteristic of the prior robotic welding systems limited their productivity and efficiency.

SUMMARY OF THE INVENTION

In accordance with the present invention, a modular robotic welding station having multiple workstations is provided that is much more easily transported than prior systems. This is accomplished by apparatus that includes a central welding module and interchangeable workpiece holding satellite modules.

The central welding module is comprised of a skid base that is supported on a factory floor. A robot manipulator, robot controller, welding power source, and welding interface are mounted to the skid base. The skid base is designed to be lifted and transported with a standard fork lift truck. The skid base defines one or more identical docking stations. At the docking station is a horizontal surface. The location of the horizontal surface is carefully controlled relative-to the placement of the robot manipulator on the skid base.

The satellite modules are designed to interchangeably dock to the skid base docking station. For that purpose, each satellite module comprises a base having a horizontal surface along one edge. The skid base horizontal surface rests on and is accurately located in the vertical directions by the horizontal surface of the skid base docking station. Docking elements accurately locate and retain the satellite module in horizontal directions relative to the skid base. The edge of the satellite module base opposite the horizontal surface thereon is provided with leveling screws.

Each satellite module includes a workpiece holding table. The table may be stationary relative to the base. Alternately, the table may be a turn table. In either case, the table is located on the satellite module at an accurately controlled location relative to the base horizontal surface and the docking elements. In that manner, any of several different satellite modules can be docked to the central welding module to suit the particular workpiece to be processed by the robotic welding system.

It is a feature of the invention that the central welding module and the satellite modules can be lifted and transported independently of each other by a conventional fork lift truck. To do so, the satellite modules are detached from the skid base. The robotic welding system can thus be moved about a manufacturing plant as relatively small individual components rather than as one large component.

Further in accordance with the present invention, a safety fence incorporated into the modular robotic welding system accommodates the interchangeable satellite modules. The safety fence comprises multiple upstanding braces secured to the base skid, there being a brace adjacent both ends of each docking station. To each brace is attached the vertical edges of two fence frames. A second vertical edge of each fence frame is supported on the floor by a post. The width of the fence frame is approximately one-half of the distance between the associated braces.

With central welding modules having more than one docking station, it is possible that no satellite module is docked at a docking station. In that case, the two fence frames associated with the empty docking station are attached to their associated braces such that the fence frames are coplanar and extend along the docking station. The fence frames thus prevent access from the docking station to the robot manipulator and other equipment mounted to the skid base.

If a satellite module is docked at a docking station, the fence frames associated with that docking station are arranged in a different configuration. The fence frames are attached to their respective braces so as to be parallel to each other and to lie on opposite sides of the satellite module. Access to the satellite module is then possible from the direction opposite the central welding module but is prevented from other directions. The safety fence also includes a gate that limits access to the robot manipulator from areas of the skid base where there are no docking stations.

The method and apparatus of the invention, using a modular construction, thus provides safety, versatility, and portability to a welding system. Different tables can be fastened to the satellite modules, and the satellite modules are interchangeably dockable at the skid base docking station to suit a wide variety of workpiece requirements.

Other advantages, benefits, and features of the present invention will become apparent to those skilled in the art upon reading the detailed description of the invention.

BRIEF DESCRIPTION OF THE DRAWINGS

FIG. 1 is a top view of the modular robotic welding station of the invention showing satellite modules at two docking stations.

FIG. 2 is a front view of FIG. 1.

FIG. 3 is a partial top view of the modular robotic welding system showing three satellite modules proximate respective docking stations.

FIG. 4 is a cross sectional view on an enlarged scale taken along line 4—4 of FIG. 1.

FIG. 5 is a view taken along line 5—5 of FIG. 4.

FIG. 6 is a cross sectional view on an enlarged scale taken along line 6—6 of FIG. 4. 25 FIG. 7 is a view taken along line 7—7 of FIG. 3 and rotated 90 degrees counterclockwise.

FIG. 8 is a cross sectional view taken along line 8—8 of FIG. 1.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Referring first to FIGS. 1–3, a modular robotic welding system 1 is illustrated that includes the present invention. The modular robotic welding system 1 is designed to be readily transported to different locations where welding operations are to be performed while maintaining the ability to accurately locate workpieces relative to a welding robot.

The modular robotic welding system 1 comprises a central welding module 2 that includes a skid base 3. The skid base 3 is supported on a floor 13 by several leveling pads 15. A robot manipulator 5, a robot controller 7, and a welding power source 9 are permanently mounted to the skid base. The robot manipulator 5 is equipped with suitable welding related components 11 which, under the control of the robot controller 7 and welding power source 9, perform conventional welding operations.

The skid base 3 defines multiple identical docking stations to which satellite modules 17 can be detachably docked. In the illustrated construction, the skid base defines three docking stations A, B, and C, each of which is equidistant from the robot manipulator 5.

The satellite modules 17 have identical bases 19. To each satellite module base 19 is fastened a workpiece holding table. The table may be a stationary table as is shown at reference numeral 23. Alternately, the table may be a turn table as is shown at reference numeral 25.

A satellite module 17, with either a stationary table 23 or a turn table 25, can be docked at any of the central welding module docking stations A, B. or C to suit the particular welding job at hand. For example, in FIG. 1 a satellite module 17B having a turn table 25B is shown docked at docking station B of the central welding module 2. A satellite module 17C having a stationary table 23C is shown at docking station C. As another example, FIG. 3 shows a third satellite module 17A with a stationary table 23A in position to be docked at docking station A. Docking elements 21, FIG. 4, are used to accurately locate and retain the docked satellite modules to the central welding module 2.

Central Welding Module

With particular attention to FIGS. 1, 3, 4, and 7, the central welding module 2 is constructed with two longitudinally extending structural tubes 27. The tubes 27 are open at docking station B. The distance between the tubes 27, as well as the size of their openings, are designed to accommodate the forks of a conventional fork lift truck. Angles 29 are welded to the tubes 27. The leveling pads 15 are adjustably threaded into the angles 29 to enable the skid base 3 to be leveled on the floor 13.

The skid base 3 is further constructed with an end tube 31, various cross tubes 33, and longitudinal reinforcement tubes 34. A heavy end plate 35 and a smaller central plate 37 are welded to the tubes 27, 33, and 34. The robot controller 7 and welding power source 9 are mounted on the end plate 35. The robot manipulator 5 is mounted on the central plate 37.

In the preferred embodiment, each of the docking stations A, B, and C of the central welding module 2 comprises a pair of spaced apart pads 39A, 39B, and 39C, respectively, on the top sides of the tubes 27 and 31. The pads 39A–39C have respective horizontal surfaces 40A–40C that are all coplanar and that are at an accurately located distance relative to the robot manipulator 5. In each pad are three holes, each also being accurately located relative to the robot manipulator. Two holes 41 are tapped. The third hole 43 is bored and counterbored to receive a flanged bushing 45. Also see FIG. 6.

Satellite Module

As mentioned, each satellite module 17 has an identical base 19. The base includes a heavy plate 47 having a top surface 46 and a bottom surface 48. A pair of tubes 49 underlie the plate 47. Also see FIGS. 5 and 8. The bottom surface 48 of the plate is machined or otherwise fabricated along one edge 50 with a flat horizontal surface 51. A pair of gussets 53 are welded to the plate top surface 46 close to and perpendicular to the edge 50. Angles 55 welded to the tubes 49 near the plate second edge 56 are provided with leveling pads 57.

Fastened to the top surface 46 of the base plate 47 is a workpiece holding table 23 or 25. In FIGS. 1, 4, and 5, a turn table 25 is shown. In FIG. 8, a stationary table 23 is shown. For both kinds of tables, the top surface thereof, such as surface 59 of the stationary table, is at an accurately controlled distance from the plate horizontal surface 51.

To accurately locate the satellite modules 17A, 17B, and 17C in the horizontal directions relative to the central welding module 2, the docking elements 21 include a pair of locating/locking pins 65, FIG. 6. Each locating/locking pin 65 is received in a respective bushing 67 that is pressed into the plate 47 of the satellite module base 19. When the satellite module is at a docking station A, B, or C, the satellite module bushings 67 are aligned with the bushings 45 in the central welding module. Accordingly, the pins 65, in cooperation with the bushings 67 and 45, locate the satellite module to the central welding module. A suitable pin 65 is a BLT-135 Reid quick-release lock pin.

The docking elements 21 also include two pairs of screws 61. The screws 61 pass through holes 63 in the base plate 47. When a satellite module 17A, 17B, or 17C is docked at a docking station A, B. or C, the holes 63 align with corresponding tapped holes 41 in the central welding module 2. In that manner, the satellite module is retained in the horizontal directions to the central welding module.

Safety Fence

Further in accordance with the present invention, and looking especially at FIGS. 1 and 2, a safety fence 69 restricts access to the docking stations A, B, and C and to any satellite module 17A, 17B, or 17C at the docking stations. The safety fence 69 also restricts access to the robot manipulator 5. The safety fence is part of the central welding module 2. The safety fence comprises a brace 71 adjacent each end of each docking station. The braces are located adjacent and outside of the pads 39A–39C of the respective docking stations. For convenience, the braces are labeled 71A, 71B, 71C, and 71D. Each brace 71A–71D is made up of a pedestal 73 that is secured to the skid base 3 by fasteners 75. A first arm 77 extends horizontally from the pedestal 73. A second arm 79 extends above the first arm 77 and at an acute angle relative thereto. The free ends of the arms 77 and 79 support a vertical angle 81. As illustrated, the four angles 81 define a square around the docking stations.

The angles 81 of the braces 71 are designed to hold one or more fence frames 83. The fence frames are arrangable on the braces in different configurations depending on whether a satellite module 17 is docked at a docking station A, B, or C. If no satellite module is at a docking station, such as at docking station A in FIGS. 1 and 2, two fence frames 83A are arranged to be coplanar with each other and to extend along the docking station. The respective outer ends 85A of the fence frames 83A are fastened to the braces 71A and 71B with screws 87. The width of the fence frames 83 is slightly less than one half the distance between the braces 71A and 71B. The fence frame inner ends 89 are fastened by screws 91 to a long post 93. The post 93 has a foot 95 that rests on the floor 13, thereby contributing to the support of the fence frames. In that manner, access is prevented to the docking station A.

When a satellite module 17 is docked at a docking station, as at docking stations B and C, the safety fence 69 is arranged in a configuration that suits that situation. Regarding the satellite module 17B at docking station B. the fence frames 83B are fastened at their respective inner ends 97 to the braces 71B and 71C such that the fence frames are on opposite sides of the satellite module 17B. The outer ends 99 of the fence frames 83B are fastened to respective posts 101. Access to the satellite module 17B is thus possible only from the direction opposite the docking station B.

Similarly, fence frames 83C are fastened to the braces 71C and 71D. The outer ends 103 of the fence frames 83C are fastened to posts 105. The fence frames 83B or 83C can be rearranged in the manner of the fence frames 83A should a satellite module not be docked at a docking station B or C.

To control access to the robot manipulator 5 from a direction other than from a docking station A, B, or C, the safety fence 69 further includes a gate 107. The gate 107 is composed of a fence frame 83D having one end 109 fastened to the brace 71A. The other end 111 of the fence frame 83D is fastened to a post 113. The post 113 has a foot 115 that rests on the end plate 35 of the base skid 3. The fence frame 83D covers approximately half of the distance between the braces 71A and 71D, thereby leaving an opening 116 between the post 113 and the angle 81D of the brace 71D.

There is an extension 117 joined by fasteners 119 to the upper ends of the angles 81A and 81D of the braces 71A and 71D, respectively. The extensions 117 bear a long horizontal channel 121. Slidable in the channel 121 is a door 123. The door 123 is slightly wider than the opening 116. The door can be slid in the channel to selectively open and close the opening 116.

Operation

In use, the modular robotic welding system 1 can have any of the satellite modules 17A, 17B, or 17C docked at any of the docking stations A, B, or C. The surface 51 of a satellite module base plate 47 is placed on the surface 40 of the central welding module 2, and the leveling screws 57 of the satellite module are adjusted to locate the satellite module in the vertical direction. The docking elements 21 accurately locate and retain the satellite module in the horizontal directions. Either a stationary cable 23 or a turn table 25 can be fastened to the satellite module base 19. The result is a modular robotic welding station 1 having customized workstations that suit the particular workpiece to be welded. The safety fence frames 83 at each docking station A, B, and C are arranged in the configuration that suits whether or not a satellite module 17 is docked at the docking station.

When it is desired to transport the modular robotic welding station 1 to a different location, the docking elements 21 are removed from the satellite modules 17 and the central welding module 2. Each satellite module is individually and readily transported by a standard fork lift truck by placing the forks thereof under the base plate 47 and outside the tubes 49. The skid base 3 is also transported without problem by placing the forks of the fork lift truck into the tubes 27. The relatively light weight and small size of the individual central welding module and satellite modules renders them much more readily portable than prior robotic welding equipment.

Thus, it is apparent that there has been provided, in accordance with the invention, a modular robotic welding station that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. Apparatus for welding workpieces comprising:
   a. a skid base that defines at least one docking station;
   b. welding means mounted on the skid base for performing selected welding operations on the workpieces; and
   c. a satellite module detachably docked to the skid base docking station, the satellite module including a table that holds the workpieces at an accurately controlled distance from the welding means, the satellite module and the skid base being independently transportable when the satellite module is detached from the skid base.

2. The apparatus of claim 1 wherein:
   a. the skid base defines a plurality of docking stations each having opposed ends; and
   b. a plurality of satellite modules are docked interchangeably at selected skid base docking stations to thereby create multiple workstations for the workpieces.

3. The apparatus of claim 1 wherein:
   a. the skid base docking station comprises a first surface located at an accurately controlled distance from the welding means; and
   b. the satellite module comprises:
      i. a second surface that rests on the skid base first surface when the satellite module is docked at the skid base docking station, the table locating the workpieces at an accurate location relative to the second surface; and
      ii. level means for cooperating with the satellite module second surface to locate the table and the workpieces held thereon at an accurately controlled distance relative to the welding means.

4. The apparatus of claim 3 wherein the satellite module further comprises docking elements that locate and retain the satellite module to the skid base docking station, the docking elements cooperating with the skid base first surface and the satellite module second surface to accurately locate the workpieces relative to the welding means.

5. The apparatus of claim 2 further comprising fence means for controlling access to the skid base docking stations at which no satellite module is docked and to the satellite modules docked at the selected skid base docking stations.

6. The apparatus of claim 5 wherein the fence means comprises:
   a. a pair of braces secured to the skid base adjacent the ends of each docking station;
   b. a pair of fence frames fastened to the pairs of braces associated with the respective docking stations; and
   c. post means for partially supporting the fence frames.

7. The apparatus of claim 6 wherein:
   a. the fence frames are coplanar and extend along a skid base docking station at which a satellite module is not docked to thereby prevent access to the docking station; and
   b. the fence frames are parallel to each other and are on opposite sides of a satellite module that is docked at a docking station to thereby limit access to the satellite module.

* * * * *